(12) United States Patent
Chu et al.

(10) Patent No.: US 7,962,313 B2
(45) Date of Patent: Jun. 14, 2011

(54) METHOD AND APPARATUS FOR USING MOBILE CODE FOR DISTRIBUTED DATA FUSION IN NETWORKED SENSING SYSTEMS

(75) Inventors: Maurice Kyojin Chu, San Mateo, CA (US); James E. Reich, San Francisco, CA (US); Kurt E. Partridge, Palo Alto, CA (US); James M. A. Begole, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 464 days.

(21) Appl. No.: 11/956,943

(22) Filed: Dec. 14, 2007

(65) Prior Publication Data

US 2009/0157352 A1   Jun. 18, 2009

(51) Int. Cl.
*G06F 19/00* (2006.01)
(52) U.S. Cl. ............................. 702/181; 702/189
(58) Field of Classification Search .............. 702/181, 702/189; 382/160; 607/62; 340/539.26, 340/523, 521
See application file for complete search history.

(56) References Cited

U.S. PATENT DOCUMENTS

| | | | |
|---|---|---|---|
| 6,502,042 B1 * | 12/2002 | Eid et al. ...................... 702/50 |
| 2003/0158587 A1 * | 8/2003 | Esteller et al. ................. 607/45 |
| 2006/0221180 A1 * | 10/2006 | Ostromek et al. ............. 348/53 |
| 2007/0258325 A1 * | 11/2007 | Grasmueck ................... 367/59 |
| 2008/0191871 A1 * | 8/2008 | Horak et al. .................. 340/566 |

* cited by examiner

*Primary Examiner* — Mohamed Charioui
*Assistant Examiner* — Elias Desta
(74) *Attorney, Agent, or Firm* — Park, Vaughn, Fleming & Dowler LLP; Shun Yao

(57) ABSTRACT

A sensing system includes a set of sensors and a data-fusing mechanism coupled to at least one of these sensors. In the set of sensors, at least one sensor is configured to store one or more measurement models for one or more phenomenon states. Furthermore, at least one sensor in the set of sensors is configured to sample a measurement value and generate a likelihood function based on the sampled measurement and the measurement models. The data-fusing mechanism coupled to a respective sensor in the set of sensors is configured to collect one or more likelihood functions generated by the one or more sensors and use the collected likelihood functions to compute an aggregate probability of a phenomenon state.

16 Claims, 2 Drawing Sheets

METHOD AND APPARATUS FOR USING MOBILE CODE FOR DISTRIBUTED DATA FUSION IN NETWORKED SENSING SYSTEMS

BACKGROUND

1. Field of the Invention

Embodiments of the present invention relate to sensing systems. More specifically, embodiments of the present invention relate to a technique for using mobile code for distributed data fusion in networked sensing systems.

2. Related Art

Networked sensing systems, where each node is equipped with sensors, a processor, and a communication device, have the capability to extract data from the sensors and process the data to monitor the environment in which they are embedded. These systems, once deployed, typically have the potential to serve the current and future sensing needs within a predefined environment.

However, anticipating all possible future sensing applications and/or all possible future sensor types is difficult, if not impossible. As sensing technologies continue to advance, it is virtually impossible to "future-proof" sensing systems to effectively take advantage of the sensing, processing, and communication capabilities of future sensors or to anticipate future sensing applications.

SUMMARY

One embodiment of the present invention provides a system that uses mobile code for distributed data fusion in networked sensing systems. One embodiment is implemented as a sensing system, including a set of sensors and a data-fusing mechanism coupled to at least one of these sensors. In the set of sensors, at least one sensor is configured to store one or more measurement models for one or more phenomenon states. Furthermore, at least one sensor in the set of sensors is configured to sample a measurement value and generate a likelihood function based on the sampled measurement and the measurement models. The data-fusing mechanism coupled to a respective sensor in the set of sensors is configured to collect one or more likelihood functions generated by the one or more sensors and use the collected likelihood functions to compute an aggregate probability of a phenomenon state.

In a variation on this embodiment, the measurement model for the sensor is in the form $P(Z=z|X=x)$, wherein Z is a random variable corresponding to the sampled measurement value and X is a random variable corresponding to the phenomenon state under investigation. The generated likelihood function from the measurement model and sampled measurement $Z=z_0$ is given by $l(x)=P(Z=z_o|X=x)$. The data-fusing mechanism is configured to compute a product of a number of likelihood functions received from different sensors, expressed as an aggregate likelihood of the phenomenon state, wherein the aggregate likelihood is in the form:

$$L(x) = P(Z_1 = z_1, Z_2 = z_2, \ldots Z_n = z_n \mid X = x) \propto \prod_{i=1}^{n} P(Z_i = z_i \mid X = x).$$

The aggregate likelihood function can then be used to compute maximum a posteriori (MAP) estimates, maximum likelihood (ML), or other estimates.

In a variation on this embodiment, the sensor is configured to communicate the likelihood function to the data-fusing mechanism in the form of mobile code.

In a variation on this embodiment, the sensing system further comprises a teaching mechanism configured to load and/or reload a new measurement model onto one or more sensors in the set of sensors.

In a variation on this embodiment, the phenomenon includes one or more of: a sound, motion, vibration, altitude, luminous intensity, proximity, pressure, temperature, radiation, timing, humidity, electromagnetic field intensity, altitude, weight, airborne particulates, chemical composition, velocity, direction, and distance.

One embodiment of the present invention provides a system for using mobile code for distributed feature extraction in networked sensing systems. The present invention is implemented as a sensing system, comprising a set of sensors that sample values for corresponding parameters, a feature-extraction mechanism included in these sensors, and a feature-aggregation mechanism. The feature-extraction mechanism uses the sampled values of the corresponding parameters to generate relevant features. Furthermore, the feature-aggregation mechanism uses the relevant features from these sensors to compute an estimate of a phenomenon state.

In a variation on this embodiment, the sensor is configured to communicate the relevant features to the feature-aggregation mechanism in the form of a mobile code.

In a variation on this embodiment, the teaching mechanism is configured to load and/or reload a corresponding feature-extraction function onto the feature-extraction mechanism in a respective sensor.

In a variation on this embodiment, the phenomenon includes one or more of: a sound, motion, vibration, altitude, luminous intensity, magnetic field intensity, proximity, pressure, temperature, radiation, timing, humidity, altitude, weight, airborne particulates, chemical composition, velocity, direction, eccentricity, distance, and location.

DETAILED DESCRIPTION

The following description is presented to enable any person skilled in the art to make and use embodiments of the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), or solid-state devices, such as flash memory, or other volatile and non-volatile storage media.

Sensor System

Figure 1:
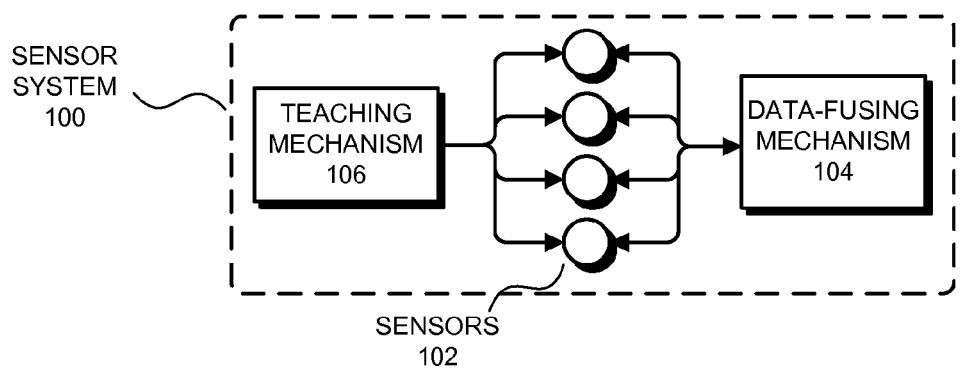
FIG. 1 illustrates an exemplary architecture for a sensor system in accordance with one embodiment of the present invention.

FIG. 1 illustrates a sensor system 100 in accordance with one embodiment of the present invention. Sensor system 100 includes sensors 102, a data-fusing mechanism 104, and a teaching mechanism 106.

Sensors 102 can include cameras, microphones, motion detectors, ultra-wideband (UWB) sensors, infrared sensors, magnetometers, thermometers, barometers, weight scales, and other types of sensors that detect sound, motion, vibration, luminous intensity, magnetic field intensity, proximity, pressure, temperature, radiation, timing, humidity, altitude, weight, airborne particulates, chemical composition, velocity, direction, and other properties and/or combinations of properties. A sensor can include a memory (e.g., a predetermined amount of RAM) for storing information and a mechanism for generating expressions for likelihood functions, which are defined below.

Sensor system 100 senses (e.g., detects, estimates, tracks, and/or monitors) phenomena using the signals observed by sensors 102 in the system. For example, sensor system 100 can sense the locations and activities of a person or object (e.g., tracking an elderly person and determining his/her location and movements) or detect the occurrence of an event (e.g., a fire in the kitchen).

Embodiments of the present invention use a probabilistic approach to sensing phenomena. In these embodiments, the state of the sensed phenomenon can be represented by a random variable X, while the raw signal observed by a given sensor can be represented by a random variable Z. For example, the Z signal for a camera can be an image, the Z signal for a microphone can be a sampled acoustic signal, and the Z signal for a thermometer can be a temperature measurement. A phenomenon state indicates the state of an observable fact or event at a given time instance. The X variable represents the actual state, or value, of the sensed phenomenon. In general, there is typically uncertainty between the measurement or observation z and the actual state x.

The relationship between the phenomenon state X and the sensor measurement Z can be represented as a measurement model:

$$P(Z=z|X=x) \quad (1)$$

which returns the probability that the sensor measurement is z given that the phenomenon state is x. A respective sensor uses this model to identify the likelihood that the phenomenon state is x given that the sensor measurement is observed to be z.

If a sensing system has n sensors labeled by i=1, . . . , n, assuming conditional independence of the sensor measurements, then the sensing system ideally represents its outcome as a posterior distribution of the probability for the possible states x given measurements z, and can be written as a probability function:

$$P(X=x|Z_1=z_1, Z_2=z_2, \ldots Z_n=z_n). \quad (2)$$

This function returns the probability that the phenomenon state is x given that the n sensor measurement are $z_1, z_2, \ldots, z_n$. (Generally, if "probability" allows the prediction of unknown outcomes based on known parameters, then "likelihood" allows the determination of unknown parameters based on known outcomes.)

In one embodiment, this probability function is approximated by first computing a product of the individual likelihood functions from the sensors:

$$L(X) = \\ P(Z_1 = z_1, Z_2 = z_2, \ldots Z_n = z_n \mid X = x) \propto \prod_{i=1}^{n} P(Z_i = z_i \mid X = x). \quad (3)$$

Then, this aggregate likelihood is used to compute the probability function by multiplying with the prior distribution P(X=x):

$$P(X=x|Z_1=z_1, Z_2=z_2, \ldots Z_n=z_n) \propto L(x)P(X=x) \quad (4)$$

Note that the information needed to calculate the phenomenon state X from the sensors is not the raw sensor measurement $z_i$, but the computed likelihood $P(Z_i=z_i|X=x)$ of a possible phenomenon state x.

Because a measurement model is typically specific to a particular sensor or sensing task and a particular phenomenon state, and because new sensors or new software may be installed in the sensor network, pre-loading all possible measurement models might not be feasible.

Embodiments of the present invention provide a mechanism 106 to "teach" a sensor how to generate one or more likelihood functions that correspond to the sensor's task. In other words, embodiments of the present invention can load and/or reload measurement models to the sensors in the system (e.g., by loading the measurement models formatted as code into the memory of a sensor). Consequently, the system can reconfigure the sensing capabilities of the sensor system as sensors are added and/or removed, or as the sensing requirements change.

Teaching mechanism 106 loads and/or reloads measurement models in sensors 102. In some embodiments, a sensor's manufacturer may serve as the initial teaching mechanism. In these embodiments, the sensor manufacturer loads measurement models for a particular or several state space(s) X on to the sensor while manufacturing the sensor.

In other embodiments, teaching mechanism 106 can be a device temporarily or permanently coupled to sensors 102 using a wired or wireless network connection or another electrical connection. In these embodiments, teaching mechanism 106 can load and/or reload new measurement models into the sensors 102 before or after the sensors have been deployed.

Data-fusing mechanism 104 is a computational device, such as an application-specific integrated circuit (ASIC), a microprocessor, an embedded processor, a controller, a computer, or another type of computational engine. Data-fusing mechanism 104 collects the likelihood functions from sensors 102 and computes the product of the individual likelihoods. From the computed product, data-fusing mechanism 104 can extract information about the sensed phenomenon. In one embodiment, data-fusing mechanism 104 is the same computational device as teaching mechanism 106.

Operation of the Sensing System

Figure 2A:
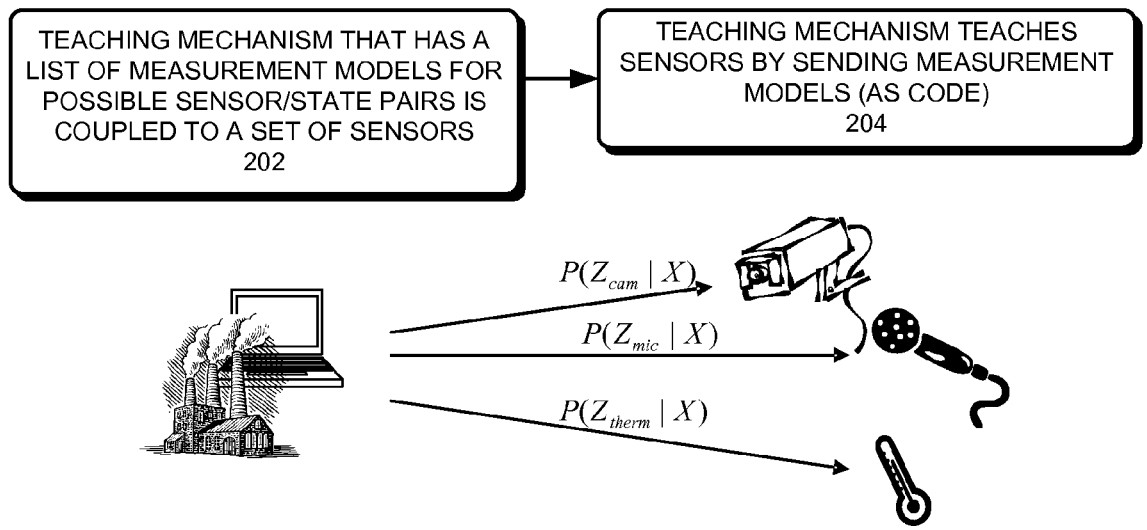
FIG. 2A presents a block diagram illustrating a series of interactions between a teaching mechanism and a set of sensors in accordance with embodiments of the present invention.

During the operation of a sensing system, two sets of interactions occur. FIG. 2A presents a block diagram illustrating the first set of interactions, which occur between a teaching mechanism 106 and a set of sensors 102. This set of interactions can be divided into two operations:

Operation 202. A teaching mechanism 106, which has a list of measurement models for possible sensor/state space pairs, is coupled to sensors 102.

Operation 204. Teaching mechanism 106 teaches one respective sensor by sending the appropriate measurement model to the sensor (e.g., teaching mechanism 106 communicates one or more measurement models to the sensor, and the sensor loads the measurement model(s) in memory). For example, a camera can be loaded with measurement models where the measurement is an image; a microphone can be loaded with measurement models where the measurement is an acoustic signal; and a thermometer can be loaded with measurement models where the measurement is a temperature reading. After this operation is complete, the one respective sensor has stored in its memory measurement models that correspond to the respective sensor's sensing modality for a plurality of possible states.

In one embodiment, a measurement model is represented as a function expression compiled into a mobile code, such as Java™ bytecode. Mobile code is a program that can be transferred from a remote system over a network and downloaded onto a local system, such that the mobile code can be executed on the local system without requiring that the program had been previously installed on the local system. The generated likelihood function corresponds to a fragment of the mobile code or a suitably modified version of the mobile code. In one variation of this embodiment, a measurement model is represented in a data table and contained in the mobile code. The generated likelihood function corresponds to a row or column of the data table.

Figure 2B:
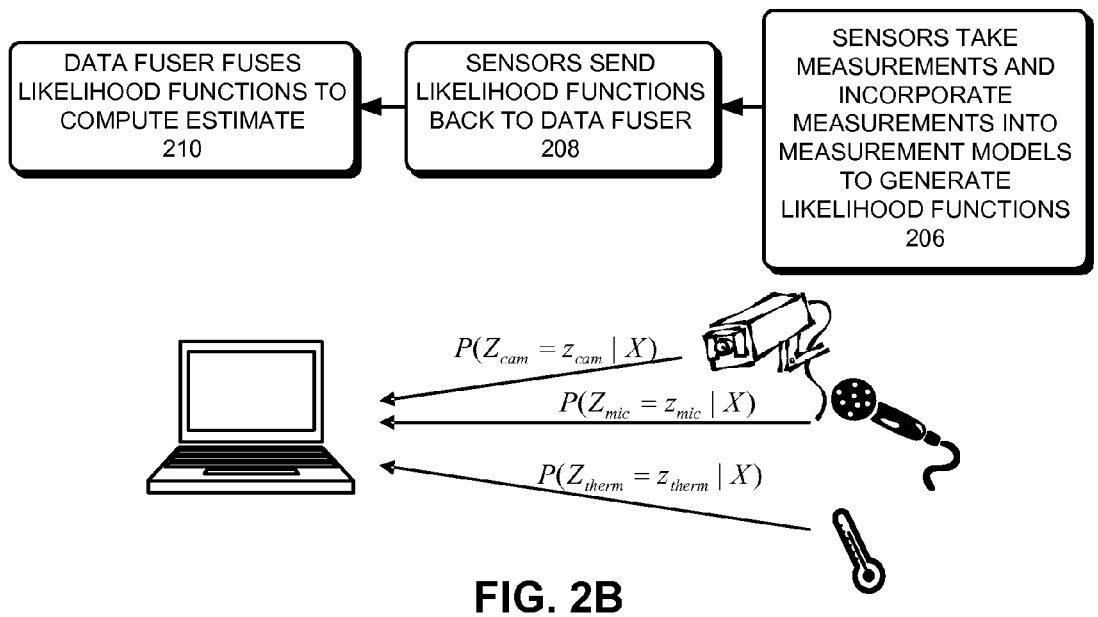
FIG. 2B presents a block diagram illustrating a series of interactions between a data-fusing mechanism and a set of sensors in accordance with embodiments of the present invention.

FIG. 2B presents a block diagram illustrating the second set of interactions between the data-fusing mechanism 104 and the sensors 102. In one embodiment, this set of interactions can be divided into three operations:

Operation 206. When data-fusing mechanism 104 requests sensor information, a respective sensor observes its sensor measurement z. This sensor generates the likelihood function of a given phenomenon using the observed value of z and the corresponding measurement model, which was passed to it in the form of mobile code (e.g., places the sensor measurement z into the measurement model to form a likelihood function).

Operation 208. A respective sensor then passes the likelihood function back to data-fusing mechanism 104.

Operation 210. Data-fusing mechanism 104 "fuses" the likelihood functions received from the individual sensors 102 to compute the aggregate likelihood of the phenomenon state based on expression (3). This aggregate likelihood can then be use to compute the posterior distribution of expression (4), or compute MAP, ML, or other estimates. Abstractly, the fusion is a product operation (e.g., the data-fusing mechanism 104 computes the product of the individual likelihood functions).

The computations described above are described in terms of the operations of: (1) generating likelihood functions; and (2) fusion by taking the product of likelihood functions. In some embodiments of the present invention, these operations can be generalized into: (1) computing relevant features of the sensor data (feature extraction); and (2) using these features to construct an estimate (feature aggregation).

Sensing Application

Figure 3:
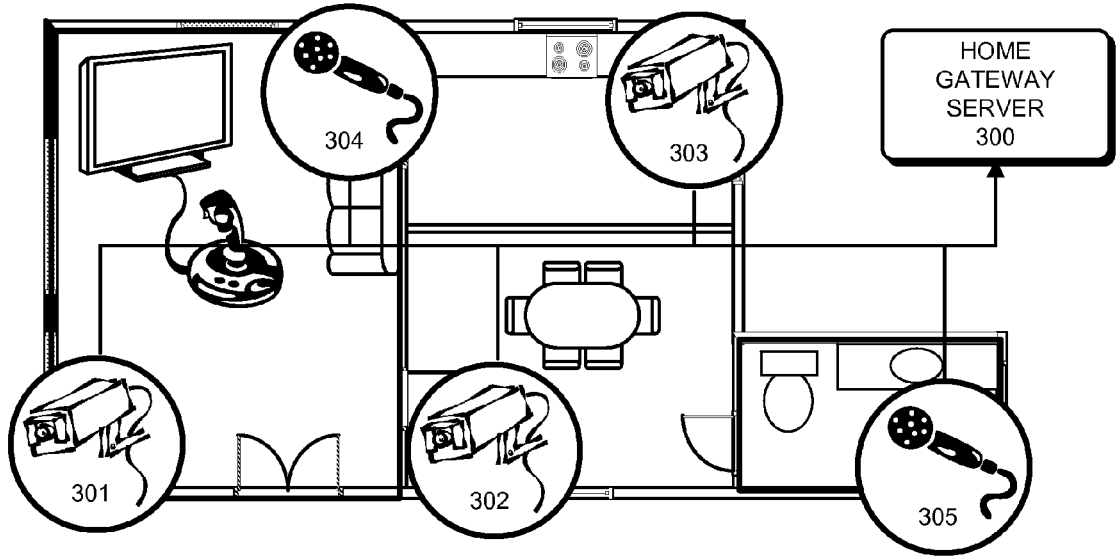
FIG. 3 presents a diagram illustrating a server coupled to a number of sensors in accordance with one embodiment of the present invention.

FIG. 3 presents a diagram illustrating a server coupled to a number of sensors in accordance with one embodiment of the present invention. In this example, server 300 is configured to use sensors installed throughout a house to compute the probability that a person is in a room of the house. The sensors include cameras 301, 302, and 303 respectively in the living room, dining room, and kitchen, and microphones 304 and 305 respectively in the bathroom and living room. During operation, the cameras can compute the number of pixels which change significantly between frames in order to determine motion and the microphones can detect sounds above a certain loudness threshold.

In some embodiments, the manufacturer of the sensors serves as teaching mechanism 106. In these embodiments, the measurement model code used to determine the likelihood of the presence of a person in the house can be pre-loaded on the cameras and microphones.

In other embodiments, another entity functions as the teaching mechanism 106. For example, server 300 could include hardware and/or software-based teaching mechanism 106 that is configured to download the measurement models from a website on the Internet for different sensor types and state spaces. Alternatively, the teaching mechanism 106 could include a database of measurement models or could download the measurement models from a proprietary database. In these embodiments, teaching mechanism 106 can be temporarily or permanently coupled to the sensors and can load and/or reload measurement model code onto the sensors.

While computing the probability that a person is in a room of the house, the server performs the operations described in operations 206-210, and optionally operations 202-204 outlined in the preceding sections as follows. Note that although the operations are described as happening in a particular order for the purposes of illustration, one or more of the operations may happen in a different order or may be skipped. For example, the system is described as loading measurement models onto the sensors as part of the process, but in some embodiments, the measurement models can be pre-loaded by a manufacturer or can be loaded when the system is initially installed (e.g., the measurement models may be loaded once and not reloaded every time that the sensing system operates).

Server 300, optionally functioning first as teaching mechanism 106, detects that there are five sensors in the house and selects the appropriate measurement model code to send to these sensors. The server then sends the measurement model code for camera sensors to sensors 301, 302, and 303, and code for microphone sensors to sensors 304 and 305. Note that the cameras and microphones include a predetermined amount of memory that is used to store the measurement model code. In addition, the cameras and microphones include a mechanism for incorporating a measured value into the measurement model code (e.g., forming a likelihood function).

Server 300, now functioning as data-fusing mechanism 104, requests the likelihood function relating to the presence of a person in the house from the set of the sensors. Each sensor i then takes a measurement $z_i$, incorporates the measured value into the corresponding measurement model, and forms a likelihood function. Next, each sensor sends the likelihood function back to server 300 as mobile code (e.g., code that can be used by both the sensor and server 300).

Next, the server receives all the likelihood functions and computes the product operation using the likelihood functions to obtain the aggregate likelihood and the posterior distribution of the probability of the presence of a person in the house.

Generalized Case

As described above, a generalization of generating likelihood functions from measurement models and computing aggregate likelihoods in the sensing system can be described as: (1) computing features and (2) aggregating these features to compute an estimate. The following section describes a generalized case of home gateway server 300 described in the preceding paragraphs. In this generalized case, server 300 does not include measurement models for each sensor/state space pair, but instead includes a feature-extraction function for each sensor/state space pair.

Server 300, first functioning as teaching mechanism 106, teaches a respective sensor its feature-extraction function for various corresponding state spaces. The respective sensor is taught how to identify particular features in a measurement for estimating a state, instead of being asked to extract a complete measurement of the state. For example, server 300 can teach the camera sensors a feature-extraction function using images for estimating whether a person is present and can teach the microphones a feature-extraction function using the acoustic signals from one's voice for estimating whether a person is present.

Server 300, now functioning as data-fusing mechanism 104, requests features from the sensors which are useful for estimating the state. Using the same example, the data-fusing mechanism 104 uses the specific voice and image features that were identified by the sensors to detect the presence of a person. A respective sensor takes a measurement z and uses the measured value to compute the features according to the feature-extraction code that corresponds to this sensor/state space pair. The sensor then sends the computed features to server 300. Finally, server 300 receives all of the features and fuses them together using the feature aggregator code to compute the estimate.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A sensing system, comprising:
    a set of sensors, each storing at least one measurement model for detecting a phenomenon state, wherein a respective sensor samples a measurement value;
    a data-fusing mechanism coupled to the sensor, which stores a first measurement model as P(Z=z|X=x),
        wherein Z corresponds to the measurement value and X corresponds to a first phenomenon state under investigation, and
        wherein the data-fusing mechanism collects likelihood functions generated by the set of sensors, and computes an aggregate probability of a second phenomenon state based on $$\prod_{i=1}^{n} P(Z_i = z_i \mid X = x)$$

which corresponds to a product of a number of n likelihood collected from the sensors.

2. The sensing system of claim 1, wherein the sensor is configured to communicate the likelihood function to the data-fusing mechanism in the form of a mobile code.

3. The sensing system of claim 1, wherein the measurement model to be taught is in the form of mobile code.

4. The sensing system of claim 1, wherein the first phenomenon state includes a state of one or more of: a sound, motion, vibration, altitude, luminous intensity, proximity, pressure, temperature, radiation, timing, humidity, electromagnetic field intensity, altitude, weight, airborne particulates, chemical composition, velocity, direction, and distance.

5. A method, comprising:
    sampling, at a respective sensor in a set of sensors, a measurement value, wherein the sensor stores a first measurement model as P(Z=z|X=x) for generating a likelihood function for a first phenomenon state, wherein Z corresponds to the measurement value and X corresponds to a first phenomenon state under investigation;
    generating likelihood functions at the sensor by placing the sampled measurement value into the first measurement model;
    collecting the likelihood functions from the set of sensors; and
    computing an aggregate probability of a second phenomenon state based on $$\prod_{i=1}^{n} P(Z_i = z_i \mid X = x)$$

which corresponds to a product of a number of n likelihood collected from the sensors.

6. The method of claim 5, wherein collecting the likelihood functions comprises communicating the likelihood functions in the form of mobile code.

7. The method of claim 5, wherein the measurement model to be loaded and/or reloaded is in the form of mobile code.

8. The method of claim 5, wherein the first phenomenon state includes a state of one or more of: sound, motion, vibration, altitude, luminous intensity, proximity, pressure, temperature, radiation, timing, humidity, electromagnetic field intensity, altitude, weight, airborne particulates, chemical composition, velocity, direction, and distance.

9. A non-transitory computer-readable storage medium including instructions that when executed by a computer system cause the computer to perform a method, the method comprising:
    sampling, at a respective sensor in a set of sensors, a measurement value, wherein the sensor stores a first measurement model as P(Z=z|X=x) for generating a likelihood function for a first phenomenon state, wherein Z corresponds to the measurement value and X corresponds to a first phenomenon state under investigation;
    generating likelihood functions at the sensor by placing the sampled measurement value into the first measurement model;
    collecting the likelihood functions from the set of sensors; and
    computing an aggregate probability of a second phenomenon state based on $$\prod_{i=1}^{n} P(Z_i = z_i \mid X = x)$$

which corresponds to a product of a number of n likelihood collected from the sensors.

10. The non-transitory computer-readable storage medium of claim 9, wherein collecting the likelihood functions comprises communicating the likelihood functions in the form of mobile code.

11. The non-transitory computer-readable storage medium of claim 9, wherein the measurement model to be loaded and/or reloaded is in the form of mobile code.

12. The non-transitory computer-readable storage medium of claim 9, wherein the first phenomenon state includes a state of one or more of: sound, motion, vibration, altitude, luminous intensity, proximity, pressure, temperature, radiation, timing, humidity, electromagnetic field intensity, altitude, weight, airborne particulates, chemical composition, velocity, direction, and distance.

13. The system of claim 1, further comprising a teaching mechanism configured to load a second measurement model onto the sensor, wherein the second measurement model configures the sensor to determine a likelihood function for a third phenomenon state based in part on the sampled measurement value.

14. The sensing system of claim 13, wherein the teaching mechanism resides with the data-fusing mechanism.

15. The method of claim 5, further comprising:
loading a second measurement model onto the sensor, wherein the second measurement model configures the sensor to determine a likelihood function for a third phenomenon state based in part on the sampled measurement value.

16. The non-transitory computer-readable storage medium of claim 9, wherein the method further comprises:
loading a second measurement model onto the sensor, wherein the second measurement model configures the sensor to determine a likelihood function for a third phenomenon state based in part on the sampled measurement value.

* * * * *